United States Patent [19]

Fantazian et al.

[11] Patent Number: 5,484,986
[45] Date of Patent: Jan. 16, 1996

[54] WELD FORCE LIMITER

[75] Inventors: George V. Fantazian, Farmington Hills; Ronald J. Eisbrenner, Shelby Township, both of Mich.

[73] Assignee: Savair Inc., St. Clair Shores, Mich.

[21] Appl. No.: 249,943

[22] Filed: May 27, 1994

[51] Int. Cl.⁶ .......................... B23K 11/10; B23K 37/02
[52] U.S. Cl. ...................... 219/86.41; 219/86.51; 219/89; 219/91.2
[58] Field of Search ................ 219/86.32, 86.33, 219/86.41, 86.51, 86.61, 89, 117.1, 91.1

[56] References Cited

U.S. PATENT DOCUMENTS

| | | |
|---|---|---|
| 2,199,286 | 4/1940 | Fischer . |
| 3,412,451 | 11/1968 | Vieser et al. . |
| 3,497,660 | 2/1970 | Henry-Biabaud . |
| 4,041,272 | 8/1977 | Burton et al. . |
| 4,135,076 | 1/1979 | Beneteau . |
| 4,563,908 | 1/1986 | Shube . |
| 4,579,042 | 4/1986 | Neff . |
| 4,645,110 | 2/1987 | Taga . |
| 4,680,441 | 7/1987 | McKendrick . |
| 4,733,042 | 3/1988 | Nishiwaki et al. . |
| 4,741,466 | 5/1988 | Birkhofer . |
| 5,032,704 | 7/1991 | Neff et al. . |
| 5,349,151 | 9/1994 | Eisbrenner et al. ............ 219/89 |

FOREIGN PATENT DOCUMENTS

| | | | |
|---|---|---|---|
| 60-223669 | 11/1985 | Japan .................. | 219/86.51 |
| 61-52995 | 3/1986 | Japan .................. | 219/89 |
| 55-0254 | 3/1993 | Japan .................. | 219/89 |
| 2063133 | 6/1981 | United Kingdom ..... | 219/89 |

Primary Examiner—Teresa J. Walberg
Assistant Examiner—J. Pelham
Attorney, Agent, or Firm—Remy J. VanOphem; John VanOphem

[57] ABSTRACT

A weld force limiting apparatus for use in bench and press type welding units which is capable of advancing a first electrode into contact with production pieces to be welded together. The weld force limiter has a high pressure air source connected thereto for supplying high pressure air to the circuit. When an initiation switch is depressed to begin the welding sequence, provided all conditions are met, the high pressure air is ported through a regulator to regulate the pressure of the air to a very low pressure such that the first electrode advances toward the production pieces under very low pressure, in particular, at a pressure which is non-injurious to the human body. Once the first electrode comes within a predetermined distance of the production pieces to be welded, a pneumatic proximity switch senses that the first electrode has come within the predetermined distance and initiates a signal to bypass the regulator thereby applying the high pressure air to the cylinder of the welder for supplying the pressure necessary to effect the welding sequence. If the first electrode does not come within the predetermined distance of the production pieces because an obstruction or a finger or arm of the operator is caught between the electrode and the production pieces, the high pressure air is not circuited to bypass the regulator and only a very low force is applied to the obstruction.

19 Claims, 3 Drawing Sheets

WELD FORCE LIMITER

BACKGROUND OF THE INVENTION

1. Field of the Invention

The present invention relates generally to bench and press type resistance welding units and, more particularly, to press type resistance welding units having automated multiple press modes for added safety.

2. Description of the Prior Art

In bench and press type resistance welding a press operator generally supports a production part with his fingers while two electrodes are pressed together with a significant pressure, typically around 4500 psi, during the welding operation. Unfortunately, the operator's fingers sometimes get injured when a finger is accidentally entangled in the welding electrodes. The prior art has proposed a somewhat limited solution to this problem by moving the two electrodes together first with a lower force, then determining if there is an obstruction between the electrodes before higher pressure is applied.

One such system is disclosed in U.S. Pat. No. 4,041,272, to Burton et al. This system determines if there is an obstruction by testing for current across the production part to be welded, then uses a complex analog logic circuit to manipulate a variety of control valves. This system has various drawbacks. First, the production parts being welded must not only be conductive, but must also have similar electrical characteristics to produce consistent results. Second, consistent electrical contact must be made with the part to be welded. Finally, the system of electronic analysis is susceptible to errors. Thus, there is a need in the art to provide a safer apparatus and method in bench and press type resistance welding machines which does not depend upon the specific characteristics of the parts to be welded, which does not require contact with the parts to be welded, and which can be easily adjusted to be used in a plethora of operations.

The prior art has proposed a variety of controls in order to selectively control the pressure applied to bench or press type resistance welding units. However, the prior art teachings with respect to the solution to this specific problem are somewhat limited in that the emphasis for adjustment of the pressure regulator was to obtain increased efficiency of the welding operation and to influence the quality of the welds to be made. For example, Beneteau, U.S. Pat. No. 4,135,076; Neff, U.S. Pat. No. 4,579,042; and McKendrick, U.S. Pat. No. 4,680,441, are all directed to selectively controlling the pressure regulator in order to effect the efficiency as well as effectiveness of the weld. U.S. Pat. No. 2,199,286 issued to Fischer is particularly directed to a safety control mechanism for the operator. Fischer teaches provision of a safety control mechanism on the stitching head of the machine which acts to automatically latch the staple forming and driving elements to prevent them from completing their staple forming and driving strokes when an obstacle in the path of a part of the mechanism is encountered, without discontinuing the operation of the staple forming and driving elements or the operation of the machine with which the stitching is associated. The safety control mechanism includes means for automatically releasing the elements when the operating device of the later acts to restore the elements to their normal position. Vieser et al, U.S. Pat. No. 3,412,451, teach a force limiting tool wherein force exerting tools are used for staking operations to effect an electrical termination. The tool inserts a post within an eyelet with a predetermined amount of force. The insertion is accomplished by driving the post into the eyelet and conversely driving the eyelet around the post. Vieser et al teach a tool which provides and exerts a predetermined amount of force regardless of the amount of tool travel required due to the varying lengths of the post as well as the variable diameters of the eyelets.

Burton et al, U.S. Pat. No. 4,041,272, teach a resistance welding apparatus affording the operator protection in order to avoid the operator's hand or fingers from being crushed between the welding electrodes. Burton is directed to the problems associated with resistance welding operations wherein a switch is placed at a predetermined position to detect whether an electrode meets an obstruction such as a finger during its low force approach. However, wearing of the electrode makes such a system ineffectiv and a condition can arise in which the power actuated electrode is more tha a finger thickness from the workpiece at the moment that it is switched to its high force operating mode. Burton teaches a resistance welding apparatus which determines if there is an obstruction by testing for curren across the production part to be welded, then uses a complex analog logic circuit to manipulate a variety of control valves. The apparatus according to the Burton reference has various drawbacks. First, the production parts being welded must not only be conductive but must also have similar electrical characteristics to produce consistent results or the parts will not be welded even though there is no obstruction. Second, consistent electrical contact must be made. Finally, the system of electronic analysis is susceptible to errors which may result in the operator being injured. Thus, there is a need in the prior art to provide a method of protecting an operator's hand in bench and press type resistance welding machines which is not dependent on any production part characteristics, which does not rely on contact with the physical part and which, of course. can be easily adjusted.

SUMMARY OF THE INVENTION

It is, therefore, one object of the present invention to provide bench and press type resistance welding unit that allows two electrodes to close together under very low pressure if they are not obstructed and come to high pressure only after they close to a position where it is determine, that no obstruction interposes the two electrodes.

It is another object of the present invention to provide a bench and press type resistance welding unit that can detect an obstruction without relying on electrical characteristics of a production part.

It is yet another object of the present invention to provide a bench and press type resistance welding unit that can detect an obstruction without physically touching the production part.

It is still another object of the present invention to provide a bench and press type resistance welding unit that can detect an obstruction without physically touching the production part and that is capable of adjusting the clearance space between the electrodes and the production part.

To achieve the foregoing objects, the present invention provides a weld force limiting apparatus for use in bench and press type welding units by enabling a limited force for moving a first electrode into contact with a production piece mounted to a second electrode and a maximum force for welding with electrodes only after contact between the first electrode and the production piece has been made. The apparatus uses a pressurized air piston cylinder to move the first electrode into contact with the second electrode in either a low pressure mode or a high pressure mode. The mode is determined by a regulator that responds to a detection device. The detection device determines if an obstruction is present; if an obstruction is detected, a safety switch halts the operation of the high pressure mode and weld.

One advantage of the present invention is that it does not rely on electrical characteristics of a production part. Another advantage of the present invention is that it can detect an obstruction without physically touching the production part. Yet another advantage of the present invention is that the amount of clearance between the electrodes and the production part can be adjusted to account for varying production parts.

Other objects, features and advantages of the present invention will be readily appreciated as the same becomes better understood after reading the subsequent description taken in conjunction with the accompanying drawings.

DETAILED DESCRIPTION OF THE PREFERRED EMBODIMENT

Figure 1:
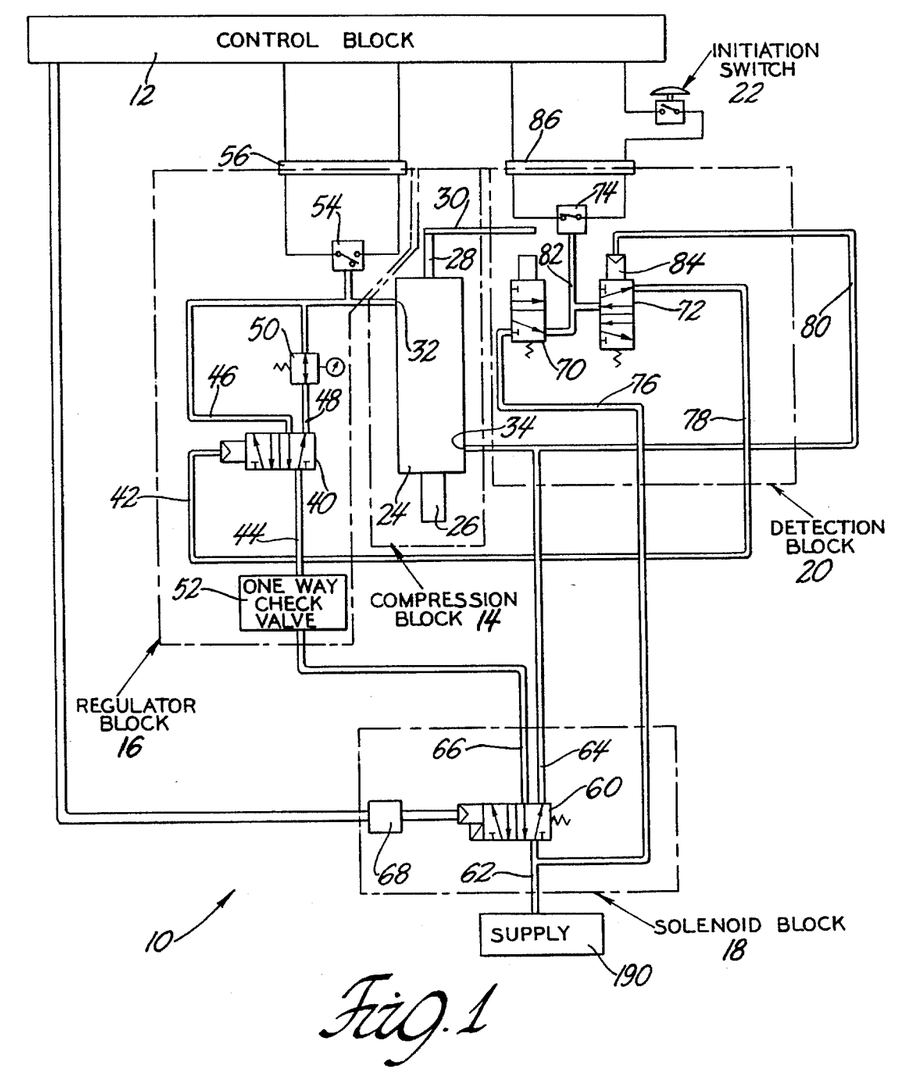
FIG. 1 is a schematic circuit diagram of a weld force limiter according to the present invention showing both electrical and pneumatic connections.

Referring to the figures in general and FIG. 1 in particular, the preferred embodiment of the present invention shows a weld force limiting circuit 10. The circuit 10 includes a control block generally indicated at 12, a compression block, generally indicated 14, a regulator block, generally indicated 16, a solenoid block, generally indicated 18, and a detection block, generally indicated 20.

The control block 12 embodies a weld controller 13 which is a microprocessor or other appropriate calculating device, capable of interpreting simple inputs from the solenoid block 18, the regulator block 16, and the detection block 20. When a normally open initiation switch 22 is pressed, and certain safe conditions in the detection block 20 are met (as described in further detail in connection with the detection block 20), a circuit is completed and output signals are sent to the solenoid block 18 and the regulator block 16 to begin a work cycle.

The compression block 14 includes a low friction cylinder 24, a movable electrode holder 26, a target holder 28, a target 30, an air input port 32, and an air return port 34. When pressurized air from the regulator block 16 is present at the air input port 32, the electrode holder 26 is pushed out from the low friction cylinder 24. A movable electrode (not shown), is mounted on the electrode holder 26 and is moved toward a stationary electrode (not shown) aligned with the movable electrode. The velocity at which the electrode holder 26 moves depends on the amount of air pressure at the air input port 32 which is applied to a piston (not shown) which is connected thereto. The target holder 28 is connected to the other end of the electrode holder 26 and moves into the low friction cylinder 24 as the electrode holder 26 moves out. The target 30 is connected in a perpendicular fashion to the target holder 28 and also moves with the electrode holder 26. The target holder 28 and target 30 are designed so that, preferably, when the electrode (not shown) held by the electrode holder 26 reaches the production part to be welded, the target 30 triggers a sensor, as described in further detail in connection with the detection block 20. When the sensor is triggered by the target 30, a much higher pressure is applied to the electrode holder 26. The low friction cylinder 24 is a pneumatic cylinder capable of stroking at very low pressures, yet capable of also operating at relatively very high pressures necessary for welding.

The regulator block 16 includes a directional control valve 40, air input lines 42 and 44, air output lines 46 and 48, a regulator valve 50, a one-way check valve 52, a normally open pressure switch 54, and a regulator interface 56. The air input line 44 is connected to the directional control valve 40 through the check valve 52, which allows air to flow only in one direction toward the control valve 40 from the supply. Prior to depressing the initiation switch 22, the directional control valve 40 is inactive, only allowing air to flow to the air output line 48 and the regulator valve 50, which is connected to the air input port 32 of the compression block 14. The regulator valve 50 is connected between the directional control valve 40 and the compression block 14. After the detection block 20 determines certain safe conditions (to be described later) are met, the air input line 42 is pressurized, activating the directional control valve 40 and switching the flow of all the air from the air input line 44 to the air output line 46, which is connected directly to the air input port 32, thereby bypassing the regulator valve 50. The directional control valve 40 operates as a pilot activated device having an output which is activated when a pneumatic input signal from the air input line 42 is present. The pressure switch 54 is connected between the output of the regulator valve 50 and the control block 12 through the regulator interface 56.

The regulator valve 50 reduces the pressure through the air output line 48 to below approximately 15 psi and preferably around 2 psi. This reduced pressure is enough to move the electrode (not shown) held by the electrode holder 26 into contact with the production part to be welded, but slight enough to be forgiving to a misplaced operator finger. Absent limiting by the regulator valve 50, the full pressure applied at the electrode (not shown) would be around 4525 psi, an amount which would do considerable damage to a misplaced hand or finger. When the directional control valve 40 is activated, switching to the air output line 46 from the air output line 48, the regulator valve 50 is effectively bypassed. The normally open pressure switch 54 determines if the pressure sent to the compression block 14 is high or low and sends this information to the control block 12 through the regulator interface 56. In the embodiment shown in FIG. 4, a normally closed pressure switch is added to the regulator block 16, the operation of which will be discussed below.

Figure 4:
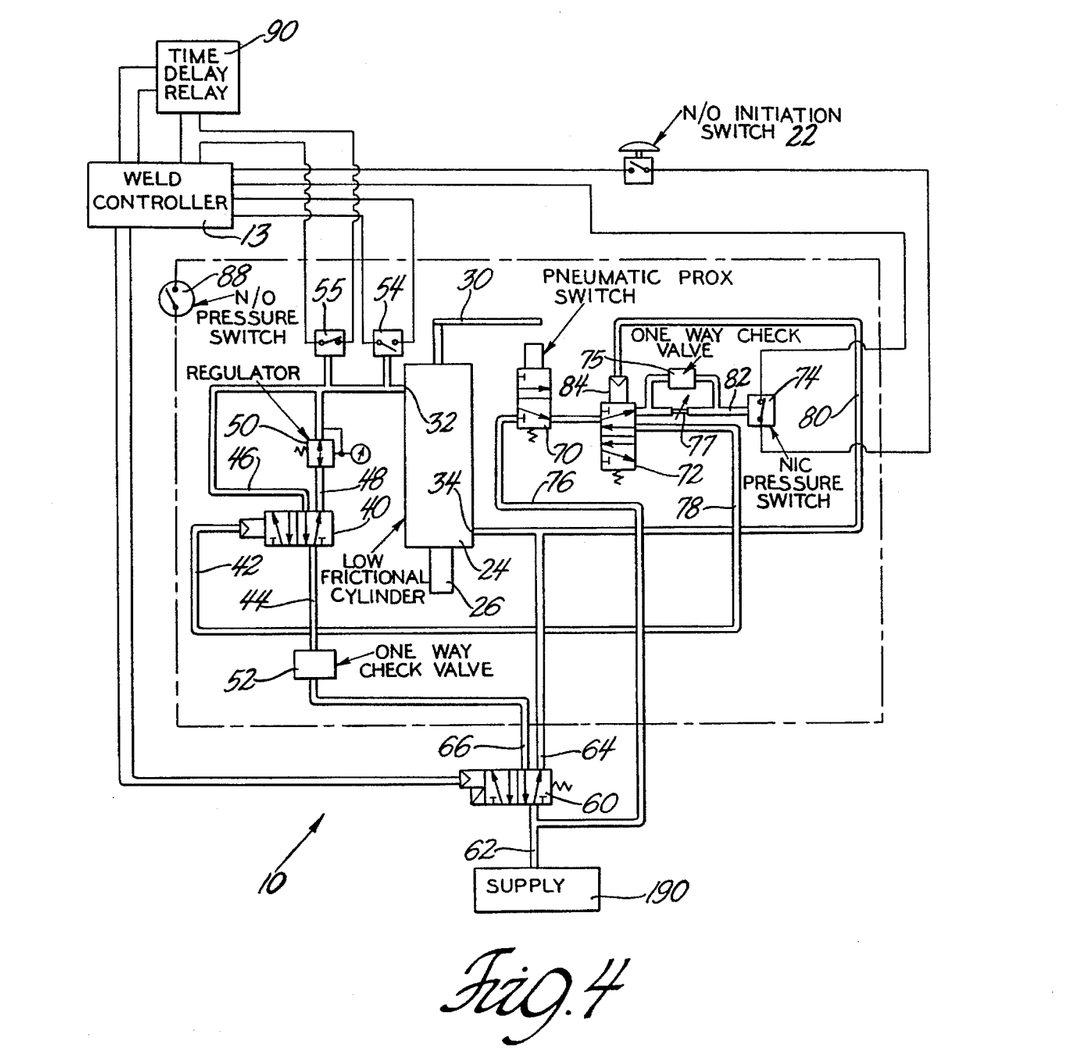
FIG. 4 is a schematic circuit diagram of an alternate embodiment of the present invention also showing electrical connections for control of the circuit.

The solenoid block 18, as shown in FIG. 1, includes a directional control valve 60, an air input line 62, air output lines 64 and 66, and a solenoid interface 68. The directional control valve 60 diverts air from the air input line 62 to either of the air output lines 64 or 66. The directional control valve 60 is a solenoid activated device with an output activated upon the presence of an electrical input signal from the solenoid interface 68 which is controlled by the control block 12. In the embodiment of FIG. 4, the control block 12, the regulator interface 56, a detection interface 86 (to be described hereinafter) and the solenoid interface 68 of FIG.

1 are all included within the weld controller 13 for purposes of clarity.

The detection block 20, as shown in FIG. 1, includes a pneumatic proximity switch 70, a directional control valve 72, a pressure switch 74, pilot air lines 76, 78, and 80, a pilot pressure line 82, a sensor 84, and the detection interface 86. The pressure switch 74 is connected to both the pneumatic proximity switch 70 and the directional control valve 72 through the pilot pressure line 82. The pressure switch 74 is also electrically connected to the control block 12 through the detection interface 86. The pneumatic proximity switch 70 is connected to the solenoid block 18 through the pilot air line 76. The directional control valve 72 is connected to the regulator block 16 through the pilot air line 78. The sensor 84 of the directional control valve 72 is connected to the air return port 34 of the low friction cylinder 24 and to the pilot air output line 64 which is connected to the directional control valve 60 of the solenoid block 18 through the pilot air line 80.

The directional control valve 72 is a pilot activated device with a first output activated and controlled depending upon the presence of a pneumatic input signal from the pilot air line 80. The valve changes position when pressure is present at the sensor 84 supplied by the pilot air line 80. The second output of the directional control valve 72 is not connected to any other component and is vented to the atmosphere. Similarly, a second output of the pneumatic proximity switch 70 is also vented to the atmosphere. Normally, there is no pressure in the pilot pressure line 82 since the pressure is vented to the atmosphere. When there is pressure in the pilot pressure line 82 the operation of the compression block 14 is suspended.

Prior to the initiation switch 22 being pressed, and the welding sequence started, the weld force limiter is in an inactivated (returned) state in which the directional control valve 60 is at rest and supplies the low friction cylinder 24 with pressurized air from a supply 190 on the air return port 34 through the air output line 64. Pressurized air is also present at the pneumatic proximity switch 70 supplied through the pilot air line 76 but is prevented from passing through the proximity switch 70 since it has not yet been activated. The directional control valve 72 controlled by the sensor 84 which reacts to air pressure in the pilot air line 80 is, in the inactivated state, pushed by the high pressure air in the pilot air line 80, out of its normal position such that air is not passed through the directional control valve 72.

When the normally open initiation switch 22 is pressed, it closes the circuit and initiates a weld sequence. If air pressure is present between the pneumatic proximity switch 70 and the directional control valve 72, the normally closed pressure switch 74 opens the circuit of the control block 12 embodying the weld controller 13, thereby preventing the weld sequence from beginning.

If the circuit is in its reset position when the initiation switch 22 is pressed, the control block 12 selectively activates the directional control valve 60 through the solenoid interface 68 causing the air from the supply 190 to be directed into the air output line 66. The pressurized air passes through the one-way check valve 52 and to the directional control valve 40. Simultaneously, the air return port 34 and the pilot air line 80 are vented to atmosphere thereby deactivating the directional control valve 72 and allowing it to return to its normal position.

Pressurized air supplied to the low friction cylinder 24 is regulated by the regulator valve 50, stroking the cylinder forward with very low air pressure and thus at a very low force. If obstructions between a moving electrode (not pictured) connected to the electrode holder 26 and the production part are not present, the electrode will travel until it is within a predetermined distance of the production part and the target 30 will travel toward the pneumatic proximity switch 70. The distance between the pneumatic proximity switch 70 and the target 30 must be preset according to the thickness of the production part to be welded and the length of the cylinder stroke so that the distance between the electrodes is appropriate for welding the production parts. If the target 30 comes within a predetermined distance of about 0.12 inches, in one example, from the pneumatic proximity switch 70, the pneumatic proximity switch 70 is activated and air pressure from the pilot air line 76 is passed through the pneumatic proximity switch 70 and the directional control valve 72 to the pilot air line 78 and the air input line 42, thereby activating the directional control valve 40. When the directional control valve 40 is activated, the specified higher pressure needed for welding is provided to the low friction cylinder 24. The predetermined distance from the target 30 to the pneumatic proximity switch 70 can be adjusted as necessary for a particular application. The predetermined distance should be calculated to be as minimal as possible. Preferably, the predetermined distance is set to be less than the thickness of a human hand or finger, but is of sufficient distance to allow the high pressure necessary for welding to be supplied just prior to, or commensurate with, the electrodes coming into contact with the production parts to be welded.

An alternative embodiment of the weld force limiting circuit 10 of FIG. 1 is shown in FIG. 4, with parts with the same reference numbers being the same as in the embodiment of FIG. 1 except where noted. The operation of the weld force limiting circuit 10 shown in FIG. 4 is essentially the same as the weld force limiting circuit 10 of FIG. 1 except for two main differences. The first main difference between the circuit 10 of FIG. 4 and the circuit 10 of FIG. 1 is that in the circuit 10 of FIG. 4 the normally closed pressure switch 74 is ported after the directional control valve 72 within the detection block 20. Additionally, a one-way check valve 75 and a flow regulator 77 are provided in the pilot air line 82 connecting the normally closed pressure switch 74 to the directional control valve 72. The one-way check valve 75 and the flow control valve 77 are used to provide better system dynamics to the normally closed pressure switch 74 during operation of the weld force limiter thereby resulting in better and more reliable performance. The one-way check valve 75 and the flow control-valve 77 prevent pressure build-up due to the inertia of the masses being moved by the high pressure air, such as the piston of the low friction cylinder 24, the movable electrode holder 26 and its associated electrode. The effects on the system are attenuated by the flow control valve 77 and the one-way check valve 75.

In the embodiments of FIG. I and FIG. 4, the normally closed pressure switch 74 serves as a means to kill the operation of the welding process if, when the normally open initiation switch 22 is pressed, the pneumatic proximity switch 70 is positioned to supply high pressure air to the directional control valve 72, for whatever reason. The normally closed pressure switch 74 will be opened by the high pressure air and operation of the welding process will not begin when the operator presses the initiation switch 22 because the circuit will not be completed. Thus, the normally closed pressure switch 74 serves as a safety check to prevent high pressure air from accidently being supplied to the low force cylinder 24 when the initiation switch 22 is pressed.

The second significant difference of the weld force limiting circuit 10 of FIG. 4 is the provision of a time delay relay 90 connected to the weld controller 13 and the normally closed pressure switch 55 which is connected adjacent the normally open pressure switch 54 just before the open air input port 32 of the low friction cylinder 24. Some welding sequences can last for a considerable amount of time, on the order of thirty seconds or longer, so that if a person's finger is caught between the electrodes, the electrodes will retain the person's hand in the welder under the very low pressure of the regulator valve 50 until the welding sequence is finished. In order to cause the weld force limiter to reset as soon as possible after detecting that the operator's hand or other obstacle is in the way of performing the welding sequence, the time delay relay circuit 90 serves to reset the machine if the target 30 does not contact the pneumatic proximity switch 70 within a predetermined amount of time after the initiation switch 22 is depressed.

With the weld force limiting circuit 10, as shown in FIG. 4, in an inactivated state, that is, with the directional control valves 40, 60 and 72 and the pneumatic proximity switch 70 in the positions as shown in FIG. 1 and FIG. 4, the normally open initiation switch 22 is pressed to begin a welding sequence. Upon depressing the initiation switch 22, the weld controller 13 signals the directional control valve 60 to move from its at rest position to its operating position in which air on the back side of the low friction cylinder 24 is allowed to escape through the air return port 34 and into the air output line 64 to vent to atmosphere. Air from the pilot air line 80 also escapes to atmosphere when the directional control valve 60 switches positions allowing the directional control valve 72 to switch from its at rest position where air from the pneumatic proximity switch 70 is supplied to the pilot air line 82 and the normally closed pressure switch 74, to a position where the air from the pneumatic proximity switch 70 is ported to the pilot air line 78 as described above. At the same time, high pressure air from the supply 190 is directed to the air output line 66 through the one-way check valve 52 to the air input line 44 and through the directional control valve 40 and is ported to the air output line 48 through the regulator valve 50 where it is reduced to an extremely low pressure air which is supplied to the air input port 32 of the low friction cylinder 24. This causes the movable electrode holder 26 to advance toward the production parts to be welded at a very low force which will not harm a hand or finger caught between the electrodes. At the same time, the target 30 advances toward the pneumatic proximity switch 70. Prior to this time, the pneumatic proximity switch 70 is in its at rest position so it does not supply any high pressure air in the pilot air line 76, but instead blocks the high pressure air from the pilot air line 76 and prevents it from being passed to the pilot air line 82 or through the directional control valve 72. Once the electrode (not shown) is within the predetermined distance of the production pieces to be welded, as previously discussed, the target 30 comes within the predetermined distance of the pneumatic proximity switch 70 and forces the pneumatic proximity switch 70 from its inactive position to an active position. In the active position, the high pressure air in the pilot air line 76 is conveyed through the pneumatic proximity switch 70 and to the directional control valve 72 where it is ported to the pilot air line 78 connected to the air input line 42 and thereby causes the directional control valve 40 to move from its inactive position, in which it supplies the high pressure air in the air input line 44 to the regulator valve 50, to an active position in which the high pressure air from the air input line 44 is supplied to the air output line 46, thereby bypassing the regulator valve 50, and supplying high pressure air directly to the air input port 32 of the low friction cylinder 24 in order to provide the force necessary to weld the production parts.

As described above, in the weld force limiting circuit 10 of FIG. 4, when the initiation switch 22 is pressed, a timer in the time delay relay 90 starts. If the target 30 does not trip the pneumatic proximity switch 70 before the timer runs out within a predetermined amount of time, as would be the case if the operator's hand or some other obstruction prevents the target 30 from coming within the predetermined distance of the pneumatic proximity switch 70, the high pressure air of the pilot air line 76 is not supplied to the air input line 42 to cause the directional control valve 40 to switch over to bypass the regulator valve 50. In this instance, the normally closed pressure switch 55 will not be opened by the high pressure air from the supply 190 prior to the timer of the time delay relay 90 timing out. This is an indication to the weld controller 13 that the electrode has not come within the predetermined distance to weld the production parts within the allotted time of the time delay relay 90, and therefore, the weld controller 13 ends the weld sequence and returns to the start or reset position. The amount of time for the timer of the time delay relay 90 to run out can be chosen such that the operator's hand or other obstruction between the electrodes of the low friction cylinder 24 is only caught under the electrodes for a few milliseconds. Obviously, the allotted time must be such that there is enough time for the low friction cylinder 24 to stroke the necessary distance to the production parts.

If there is no obstruction in the way of the electrode of the welder, the target comes within the predetermined distance of the pneumatic proximity switch, thereby switching the pneumatic proximity switch 70 causing the directional control valve 40 to bypass the regulator valve 50 in which case the high pressure air from the supply 190 is ported to the normally closed pressure switch 55 via the air output line 46 causing the normally closed pressure switch 55 to open prior to the timer of the time delay relay 90 timing out, thereby indicating to the weld controller 13 to continue with the welding process. Thus, from the above, it should be obvious that if the normally closed pressure switch 55 is not opened by the high pressure air supplied from the air output line 46 prior to the timer of the time delay relay 90 timing out, the weld sequence will be cancelled and the system returned to its start position and if the normally closed pressure switch 55 is opened prior to the timer of the time delay relay 90 timing out, then the welding sequence is not interrupted by the time delay relay 90 and the production parts are welded.

Figure 2:
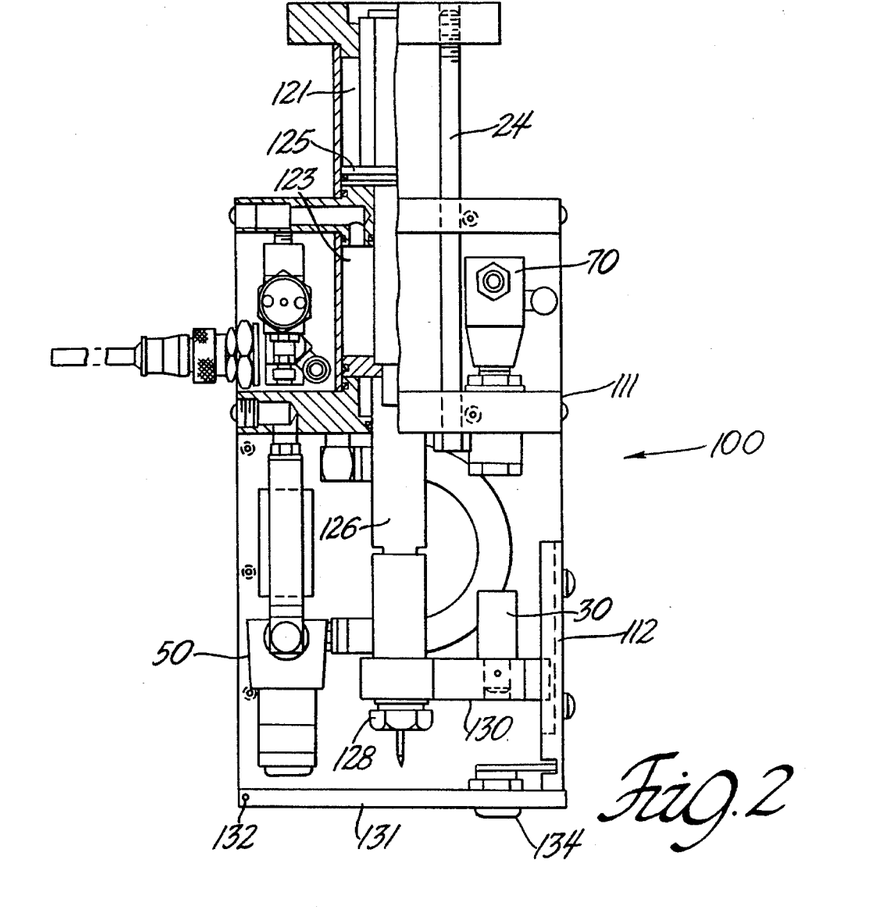
FIG. 2 is a partially cut-away side view of a pneumatic cylinder in accordance with the present invention.
Figure 3:
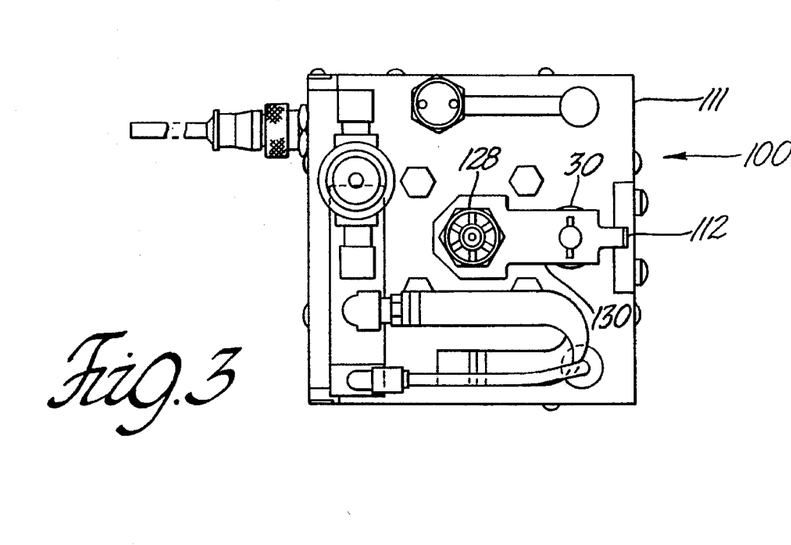
FIG. 3 is an end view of a pneumatic cylinder in accordance with the present invention.

A physical embodiment of a weld force limiter 100, according to the schematic diagram of FIG. 1, is shown in FIGS. 2 and 3. The weld force limiter 100 has a casing 111 for holding the low friction cylinder 24 having the target 30 connected thereto, and the target 30 has an end located in a slot 112 of the casing 111. The low friction cylinder 24 has a first chamber 121 and a second chamber 123 divided by a piston 125. A piston rod 126 is connected to the target 30 via an adjuster 128. The adjuster 128 is provided for adjusting the setting of the predetermined distance, as described hereinabove. The target 30 is connected to the adjuster 128 via a target adapter 130. The casing 111 is closed at the end using a base plate 131 which is hinged to the casing 111 via a hinge 132 and is closed therewith using a lock 134. The other elements of the physical embodiments of FIG. 2 and FIG. 3 are as described previously in the schematic diagrams of FIG. 1 and FIG. 4.

The present invention has been described in an illustrative manner. It is to be understood that the terminology which has been used is intended to be in the nature of words of description rather than of limitation.

While the invention has been described in terms of a preferred embodiment, it is apparent that other forms could be adopted by one skilled in the art. In particular, the present invention has been shown as being nearly completely pneumatically created. For example, the directional control valves 72 and 40 have been disclosed as being pneumatically controlled. It would be obvious to one of ordinary skill in the art to adapt the present invention to have the directional control valves 72 and 40 be electrically controlled by the control block 12. It should be obvious to one of ordinary skill in the art to combine the time delay relay 90 into the weld controller 13 of FIG. 4. Additionally, the present invention can be adapted to work in any device utilizing a piston and cylinder, such as welders, presses, robots and others not yet contemplated. Accordingly, the scope of the invention is to be limited only by the following claims:

What is claimed is:

1. A weld force limiting apparatus for providing a limited force for moving a first electrode into contact with a production part and a maximum force for welding, said apparatus comprising:

control means having a first interface, a second interface, and a third interface for controlling a transition between said limited force and said maximum force;

compression means having a first air input and an air return, for using pressurized air to move said first electrode into contact with said production part in either a low pressure mode or a high pressure mode responsive to pressure at said first air input;

regulator means having an output connected to said first air input of said compression means, a second air input, a first input pilot line, and a regulator interface connected to said second interface of said control means for receiving a signal from said control means, said regulator means providing either high pressure air or low pressure air to said compression means in response to said signal present at said first input pilot line;

solenoid means having an input air line connected to an air supply, a first output air line connected to said second air input of said regulator means, a second output air line connected to said air return of said compression means, a first output pilot line, and a solenoid interface connected to said first interface for providing a signal from said control means, said solenoid means adapted to divert air flow between said first and said second output air lines in response to said signal present at said solenoid interface; and detection means having a third air input line connected to said air return of said compression means, a detection interface connected to said third interface for receiving a signal from said control means, a second output pilot line connected to said first input pilot line of said regulator means and a second input pilot line connected to said air supply, said detection means adapted to detect when said first electrode is within a predetermined distance of said production part and to signal said regulator means to provide said high pressure air to said first air input of said compression means.

2. The apparatus of claim 1 wherein said control means further comprises an initiation switch connected between said third interface and said detection means for signaling a beginning of a welding sequence.

3. The apparatus of claim 1 wherein said compression means further comprises:

a low friction pneumatic cylinder;

a movable electrode holder which secures said first electrode and which moves out of said compression means; and a target that is connected to said movable electrode holder and moves into said low friction pneumatic cylinder as said movable electrode holder moves out of said low friction pneumatic cylinder.

4. The apparatus of claim 1 wherein said regulator means further comprises a directional control valve having an input connected to said first output air line, a pilot input, a first directional control output line connected to said compression means, and a second directional control output line, said directional control valve switching between said first and second directional control output lines in response to a pilot signal present at said pilot input.

5. The apparatus of claim 4 wherein said regulator means further comprises a pressure regulator valve having an input connected to said second directional control output line and having an output connected to said compression means, said pressure regulator valve adapted to reduce the pressure of air to said compression means.

6. The apparatus of claim 1 wherein said regulator interface further comprises a pressure switch having an input connected to said second interface and having an output connected to said compression means, said pressure switch signaling said control means when said regulator means provides high pressure air.

7. The apparatus of claim 3 wherein said detection means further comprises a pneumatic proximity switch having an input, a first output connected to said first input pilot line, and a second output connected to atmosphere, said pneumatic proximity switch connected to said first output when said target is within a predetermined distance.

8. The apparatus of claim 7 wherein said predetermined distance is adjustable.

9. The apparatus of claim 7 wherein said detection means further comprises a directional control valve having an input, a first output connected to said regulator means, a second output connected to atmosphere, and a pilot input connected to said air return, said directional control valve switching between said first and second outputs in response to pressure at said pilot input.

10. The apparatus of claim 9 wherein said detection means further comprises a pressure switch having an input connected to said third interface and having an output connected to both the output of said pneumatic proximity switch and the input of said directional control valve, said pressure switch signaling said control means through said third interface when pressure is sensed at said output.

11. The apparatus of claim 1 wherein said control means further comprises an initiation switch connected between said third interface and said detection means for signaling a beginning of a welding sequence;

a normally closed pressure switch connected to said first air input of said compression means; and a time delay relay circuit connected to said control means and said normally closed pressure switch, said time delay relay for resetting said apparatus if said detection means does not detect said first electrode within said predetermined distance of said production part within a predetermined amount of time.

12. The apparatus of claim 11 wherein said compression means further comprises:

a low friction pneumatic cylinder;

a movable electrode holder which secures said first electrode and which moves out of said compression means; and a target connected to said movable electrode holder and connected to said low friction pneumatic cylinder as said movable electrode holder moves out of said low friction pneumatic cylinder.

13. The apparatus of claim 12 wherein said regulator means further comprises a first directional control valve having an input connected to said first output air line, a pilot input, a first directional control output line connected to said compression means, and a second directional control output line, said first directional control valve switching between said first and second directional control output lines in response to a pilot signal present at said pilot input.

14. The apparatus of claim 13 wherein said regulator means further comprises a pressure regulator valve having an input connected to said second directional control output line and having an output connected to said compression means, said pressure regulator valve adapted to reduce the pressure of air to said compression means.

15. The apparatus of claim 14 wherein said regulator interface further comprises a pressure switch having an input connected to said second interface and having an output connected to said compression means, said pressure switch signaling said control means when said first directional control valve switches to said first directional control output line.

16. The apparatus of claim 15 wherein said detection means further comprises a pneumatic proximity switch having an input, a first output connected to said first input pilot line, and a second output connected to atmosphere, said pneumatic proximity switch connected to said first output when said target is within a predetermined distance.

17. The apparatus of claim 16 wherein said predetermined distance is adjustable.

18. The apparatus of claim 17 wherein said detection means further comprises a second directional control valve having an input, a first output connected to said regulator means, a second output connected to atmosphere, and a pilot input connected to said air return, said second directional control valve switching between said first and second outputs in response to pressure at said pilot input.

19. The apparatus of claim 18 wherein said detection means further comprises a pressure switch having an input connected to said third interface and having an output connected to both the output of said pneumatic proximity switch and the input of said second directional control valve, said pressure switch signaling said control means through said third interface when pressure is sensed at said output.

* * * * *

UNITED STATES PATENT AND TRADEMARK OFFICE
CERTIFICATE OF CORRECTION

PATENT NO. : 5,484,986
DATED : January 16, 1996
INVENTOR(S) : George V. Fantazian and Ronald J. Eisbrenner It is certified that error appears in the above-indentified patent and that said Letters Patent is hereby corrected as shown below:

Column 2, line 16, delete "ineffectiv" insert ---- effective ----.

Column 2, line 17, delete "tha" insert ---- than ----.

Column 2, line 21, delete "curren" insert ---- current ----.

Column 2, line 36, delete "course." insert ---- course, ----.

Column 2, line 41, after "provide" insert ---- a ----.

Column 2, line 44, delete "determine," insert ---- determined ----.

Column 6, line 48 and 49, delete "control-." insert ---- control ----.

UNITED STATES PATENT AND TRADEMARK OFFICE
CERTIFICATE OF CORRECTION

PATENT NO. : 5,484,986
DATED : January 16, 1996
INVENTOR(S) : George V. Fantazian and Ronald J. Eisbrenner It is certified that error appears in the above-indentified patent and that said Letters Patent is hereby corrected as shown below:

Column 6, line 55, delete "I" insert --1 --.

Signed and Sealed this

Thirtieth Day of April, 1996

Attest:

BRUCE LEHMAN

*Attesting Officer*  Commissioner of Patents and Trademarks